US010742727B2

(12) United States Patent
Arrington et al.

(10) Patent No.: US 10,742,727 B2
(45) Date of Patent: Aug. 11, 2020

(54) INTERFACING LEGACY ANALOG COMPONENTS TO DIGITAL MEDIA SYSTEMS

(71) Applicant: Arria Live Media, Inc., Hillsboro, OR (US)

(72) Inventors: Edward D. Arrington, Hillsboro, OR (US); David B. Andersen, Forest Grove, OR (US); Carol Bell, Beaverton, OR (US)

(73) Assignee: Arria Live Media, Inc., Hillsboro, OR (US)

( * ) Notice: Subject to any disclaimer, the term of this patent is extended or adjusted under 35 U.S.C. 154(b) by 63 days.

(21) Appl. No.: 15/452,701

(22) Filed: Mar. 7, 2017

(65) Prior Publication Data
US 2017/0272513 A1    Sep. 21, 2017

Related U.S. Application Data

(63) Continuation-in-part of application No. 15/405,201, filed on Jan. 12, 2017, now abandoned.
(Continued)

(51) Int. Cl.
*H04L 29/08* (2006.01)
*H04L 12/28* (2006.01)
*H04L 29/06* (2006.01)

(52) U.S. Cl.
CPC ...... *H04L 67/1042* (2013.01); *H04L 12/2807* (2013.01); *H04L 12/2838* (2013.01);
(Continued)

(58) Field of Classification Search
CPC . H04L 65/605; H04L 65/608; H04L 65/4076; H04L 67/104; H04L 67/1042;
(Continued)

(56) References Cited

U.S. PATENT DOCUMENTS

| 6,611,537 B1 | 8/2003 | Edens et al. |
| 7,027,775 B2 | 4/2006 | Kamimura |

(Continued)

FOREIGN PATENT DOCUMENTS

| WO | WO-2005048257 A1 * | 5/2005 | ....... G11B 20/10527 |
| WO | 2016079526 A1 | 5/2016 | |

OTHER PUBLICATIONS

International Search Report, dated Apr. 7, 2017, PCT International App. No. PCT/US17/13601, filed Jan. 14, 2017, Arria Live Media, Inc., 4 pgs.
(Continued)

*Primary Examiner* — Kostas J Katsikis
(74) *Attorney, Agent, or Firm* — Chernoff, Vilhauer, McClung & Stenzel, LLP

(57) ABSTRACT

An audio processing device includes a first analog cable connector that receives at least one analog audio source signal from a first analog cable. The first analog cable connector suitable to detachably interconnect the audio processing device to the first analog cable. The audio processing device includes a second analog cable connector and transmits the at least one analog audio source signal to the second analog cable connector suitable to be received by a second analog cable, where the second analog cable connector is suitable to detachably interconnect the audio processing device to the second analog cable. The audio processing device includes digital identification data that identifies the audio processing device. The audio processing device transmits the digital identification data to the second analog cable connector suitable to be received by the second analog cable. An enclosure that encloses the audio processing device.

7 Claims, 11 Drawing Sheets

Related U.S. Application Data

(60) Provisional application No. 62/308,650, filed on Mar. 15, 2016.

(52) U.S. Cl.
CPC ........ *H04L 65/4076* (2013.01); *H04L 65/605* (2013.01); *H04L 65/608* (2013.01); *H04L 67/104* (2013.01); *H04L 2012/2849* (2013.01)

(58) Field of Classification Search
CPC ............. H04L 12/2807; H04L 12/2838; H04L 2012/2849
See application file for complete search history.

(56) References Cited

U.S. PATENT DOCUMENTS

| | | | |
|---|---|---|---|
| 8,358,791 B2 | 1/2013 | Joiner et al. | |
| 8,369,541 B2 | 2/2013 | Joiner et al. | |
| 8,422,701 B2 | 4/2013 | Joiner et al. | |
| 8,744,087 B2 | 6/2014 | Bodley et al. | |
| 9,031,262 B2 | 5/2015 | Silfvast et al. | |
| 9,036,834 B2 | 5/2015 | Fujita et al. | |
| 9,048,961 B2 | 6/2015 | Fujita et al. | |
| 9,071,913 B2 | 6/2015 | Koch et al. | |
| 9,277,310 B1* | 3/2016 | Nohr | H04R 1/1041 |
| 9,306,685 B2 | 4/2016 | Brown et al. | |
| 9,386,123 B2 | 7/2016 | Pan | |
| 9,398,372 B2 | 7/2016 | Mashita et al. | |
| 9,514,723 B2 | 12/2016 | Silfvast et al. | |
| 9,615,175 B2 | 4/2017 | Georgi et al. | |
| 9,621,224 B2 | 4/2017 | Babarskas et al. | |
| 2002/0042282 A1 | 4/2002 | Haupt | |
| 2003/0023741 A1 | 1/2003 | Tomassetti et al. | |
| 2005/0262226 A1* | 11/2005 | Holloway | G08C 19/28 |
| | | | 709/221 |
| 2006/0048635 A1* | 3/2006 | Campbell | G10H 3/18 |
| | | | 84/742 |
| 2007/0117580 A1 | 5/2007 | Fehr | |
| 2007/0149246 A1 | 6/2007 | Bodley et al. | |
| 2007/0198669 A1* | 8/2007 | Convertino | H04L 12/2807 |
| | | | 709/220 |
| 2009/0233617 A1 | 9/2009 | Bjamason et al. | |
| 2009/0287652 A1* | 11/2009 | Chen | H04L 12/2812 |
| 2009/0304197 A1 | 12/2009 | Joiner | |
| 2009/0304206 A1 | 12/2009 | Joiner | |
| 2009/0307383 A1 | 12/2009 | Joiner | |
| 2010/0283749 A1* | 11/2010 | Walkington | G06F 1/163 |
| | | | 345/173 |
| 2010/0305728 A1 | 12/2010 | Aiso | |
| 2011/0028218 A1* | 2/2011 | Gomes | G09B 15/00 |
| | | | 463/39 |
| 2011/0093628 A1* | 4/2011 | Bulgin | G06F 5/14 |
| | | | 710/56 |
| 2011/0112666 A1* | 5/2011 | McFarland | G06F 3/162 |
| | | | 700/94 |
| 2011/0274294 A1 | 11/2011 | Fujita et al. | |
| 2011/0296484 A1* | 12/2011 | Harres | H04H 20/57 |
| | | | 725/114 |
| 2012/0047435 A1 | 2/2012 | Holladay et al. | |
| 2012/0151083 A1 | 6/2012 | Price | |
| 2012/0200774 A1* | 8/2012 | Ehlers, Sr. | H04N 21/4104 |
| | | | 348/515 |
| 2012/0258751 A1 | 10/2012 | Koch et al. | |
| 2012/0281848 A1 | 11/2012 | Koch et al. | |
| 2012/0299937 A1 | 11/2012 | Brown et al. | |
| 2013/0245799 A1 | 9/2013 | Terada | |
| 2013/0266155 A1 | 10/2013 | Mashita et al. | |
| 2014/0064519 A1 | 3/2014 | Silfvast | |
| 2015/0032797 A1 | 1/2015 | Pan | |
| 2015/0228262 A1 | 8/2015 | Silfvast et al. | |
| 2015/0254055 A1 | 9/2015 | Okabayashi et al. | |
| 2015/0304769 A1* | 10/2015 | Weijand | H04R 1/1041 |
| | | | 381/123 |
| 2015/0358052 A1* | 12/2015 | Muirhead | H04B 7/18506 |
| | | | 455/41.1 |
| 2016/0277857 A1 | 9/2016 | Okabayashi | |
| 2017/0171361 A1* | 6/2017 | Green | H04L 65/601 |
| 2017/0208112 A1* | 7/2017 | Arrington | H04L 12/10 |

OTHER PUBLICATIONS

Written Opinion, dated Apr. 7, 2017, PCT International App. No. PCT/US17/13601, filed Jan. 14, 2017, Arria Live Media, Inc., 3 pgs.

* cited by examiner

INTERFACING LEGACY ANALOG COMPONENTS TO DIGITAL MEDIA SYSTEMS

CROSS-REFERENCE TO RELATED APPLICATIONS

This application claims the benefit of U.S. Provisional App. No. 62/308,650, filed Mar. 15, 2016, U.S. Provisional App. No. 62/280,249, filed Jan. 19, 2016 and U.S. Provisional App. No. 62/280,235, filed Jan. 19, 2016.

FIELD OF THE INVENTION

The present invention relates to a media system.

BACKGROUND OF THE INVENTION

Media systems receive audio and/or video media streams from one or more sources, process the media streams in some manner, and then distribute the one or more resulting media streams to one or more output devices which may include speakers, video monitors, and recording devices.

A mixing console or audio mixer, generally referred to as a sound board is an electronic device for combining audio signals, routing the received and/or combined audio signals, and changing the level, timbre, and/or dynamics of the audio signals. The modified signals are combined together to produce combined output signals.

Multiple mixers may be used where the mixers perform sub-mixing. The mixing of the audio signals occurs in a hierarchical fashion, with groups of signals being pre-mixed in one mixer, and the result of that pre-mix being fed into another mixer where it is combined with other individual signals or other pre-mixes coming from other sub-mixers.

Referring to FIG. 1, traditionally media systems are implemented using a central mixing console that is responsible for combining, processing, and distributing the various media streams. The system's connectivity is configured with the central device as a hub and point-to-point connections extending between the central device and each input or output device. Furthermore, in most instances, these point-to-point connections between the central device and endpoints usually accommodate only the media signal itself. The central device does not typically have a manner of determining what endpoint devices are connected to it, nor a manner of directly controlling the endpoint devices.

For example, in the case of a sound reinforcement system for live performance, the central device is the audio mixing console. The endpoint devices are microphones, instruments, and speakers, and the connectivity between each of these endpoints and the mixing console is an analog cable.

The mixing console cannot determine by itself which of its ports have endpoint devices connected, nor can it determine what endpoint device is connected to a given port, nor can it directly control endpoint devices. As a result, signal routing is often very complex and it is very common for errors to occur when setting up the many signal paths required in a typical sound system.

Because the mixing console cannot determine how many of its ports have endpoint devices connected, it must always present the user with control capabilities for all possible ports. So even if there is only one microphone and one speaker connected, the user must still cope with a complicated control interface that may support dozens of endpoint devices. Also, the inability to control endpoints often makes it necessary for a system operator to physically go to where the endpoint devices are located in order to adjust endpoint device settings such as power on/off, gain, frequency, etc.

Referring to FIG. 2, in the case of a consumer entertainment system, the central device is an A/V receiver, and the endpoints are devices such as cable boxes, DVRs, media streamers, speakers, and video monitors. Connectivity between the endpoints and the central device is usually implemented either with one or more analog cables, optical cables, or via digital HDMI cables, all of which are strictly point-to-point connections.

While HDMI cables may provide for exchange of some limited device identification and control information, analog and optical cables do not. So, in the general case, the AN receiver does not necessarily know which of its ports have devices connected, what the connected devices are, or have a way to control those devices. This gives rise to the alarmingly large collection of remote control units needed to operate a typical consumer entertainment system, which in turn makes such systems so very difficult to fathom and vexing to use.

SUMMARY OF THE INVENTION

In one embodiment, an audio processing device includes a first analog cable connector that receives at least one analog audio source signal from a first analog cable. The first analog cable connector suitable to detachably interconnect the audio processing device to the first analog cable. The audio processing device includes a second analog cable connector and transmits the at least one analog audio source signal to the second analog cable connector suitable to be received by a second analog cable, where the second analog cable connector is suitable to detachably interconnect the audio processing device to the second analog cable. The audio processing device includes digital identification data that identifies the audio processing device. The audio processing device transmits the digital identification data to the second analog cable connector suitable to be received by the second analog cable. An enclosure that encloses the audio processing device.

DETAILED DESCRIPTION OF PREFERRED EMBODIMENTS

Figure 1:
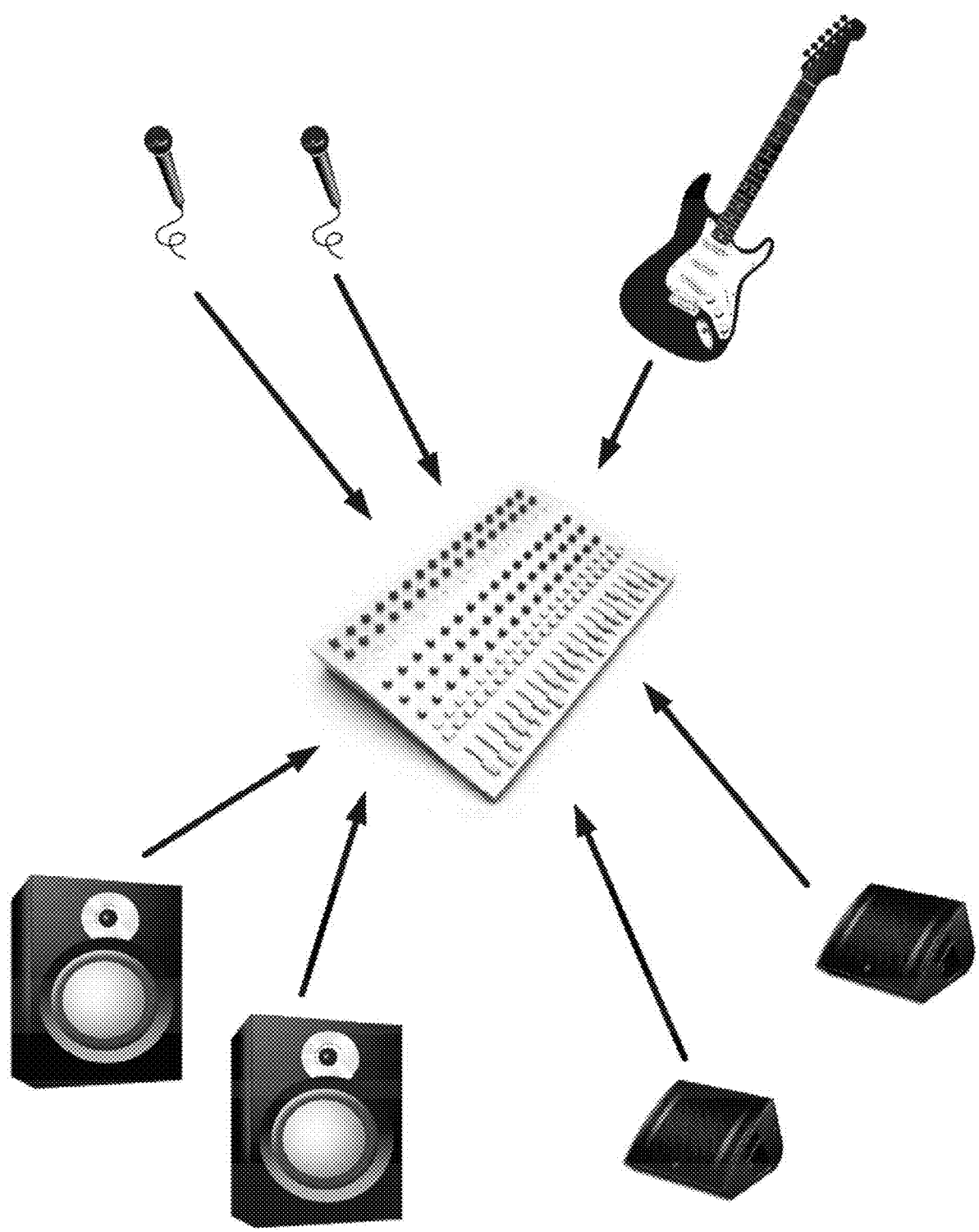
FIG. 1 illustrates a media system.
Figure 2:
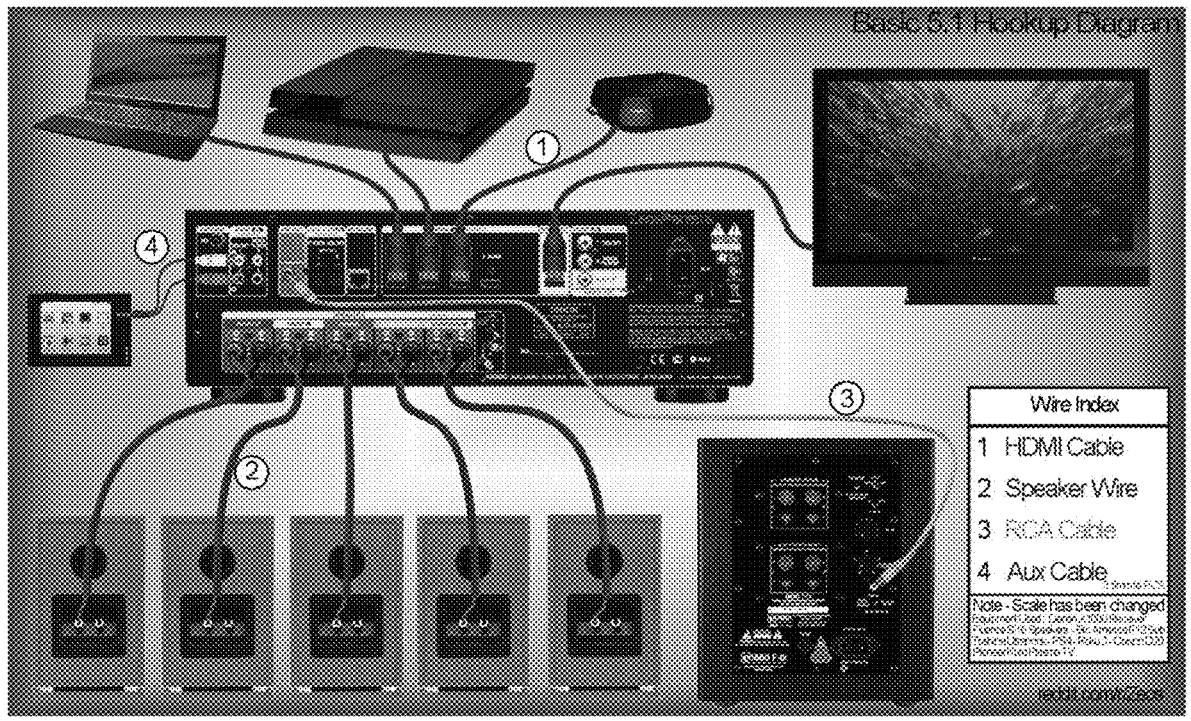
FIG. 2 illustrates a consumer entertainment system.

Architecting media systems around a sophisticated central device has been the prevailing practice for many decades. This is because media systems, by their very nature, require synchronization and control coordination of all audio and video streams. Historically, the only technically viable and cost-effective way to implement the needed synchronization, control, and functionality has been to incorporate all of the "intelligence" in a sophisticated central device and utilize point-to-point connections that carry only a media stream, to relatively less sophisticated end points.

However, when media systems utilize this central device architecture, the intrinsic feature set and capacities of the central device imposes constraints on the media system as a whole. In particular the central device determines the media system's capacity, as measured by the number of endpoints (both input and output devices) that can be accommodated. In particular, the central device also determines the media system's set of processing features. In particular, the central device may further determine the media system's control mechanisms and methodologies.

Expanding either the system capacity or the feature set or changing the system control mechanisms (for example to provide remote control via a tablet) generally means replacing an existing central device with a more capable one. Furthermore, connecting a sophisticated central device to the endpoint devices using point-to-point links that carry no information other than the media stream itself results in media systems being very complex to configure, being subject to frequent configuration errors that are difficult to find, and being very complicated to operate. In general, sound reinforcement systems built around audio mixing consoles or consumer entertainment systems built around A/V receivers are difficult and complicated to configure and operate.

High capacity digital networking may be used as a communication backbone to facilitate re-architected media systems in ways that facilitate many compelling advantages. One of the resulting advantages, with a suitably re-architected media system is to greatly simplify the tasks of configuring and setting up a media system. Another of the resulting advantages, with a suitably re-architected media system is allowing media devices to be dynamically inserted into and removed from a functioning media system with plug and play simplicity. Another of the resulting advantages, with a suitably re-architected media system is to significantly improving ease of operation. Yet another of the resulting advantages, with a suitably re-architected media system is enabling a media system's capacity to scale incrementally without obsoleting or needing to replace other components. Yet another of the resulting advantages, with a suitably re-architected media system is allowing additional functionality to be introduced without obsoleting or needing to replace other components. Moreover one of the resulting advantages, with a suitably re-architected media system is reducing the number of components needed to implement a media system.

Figure 3:
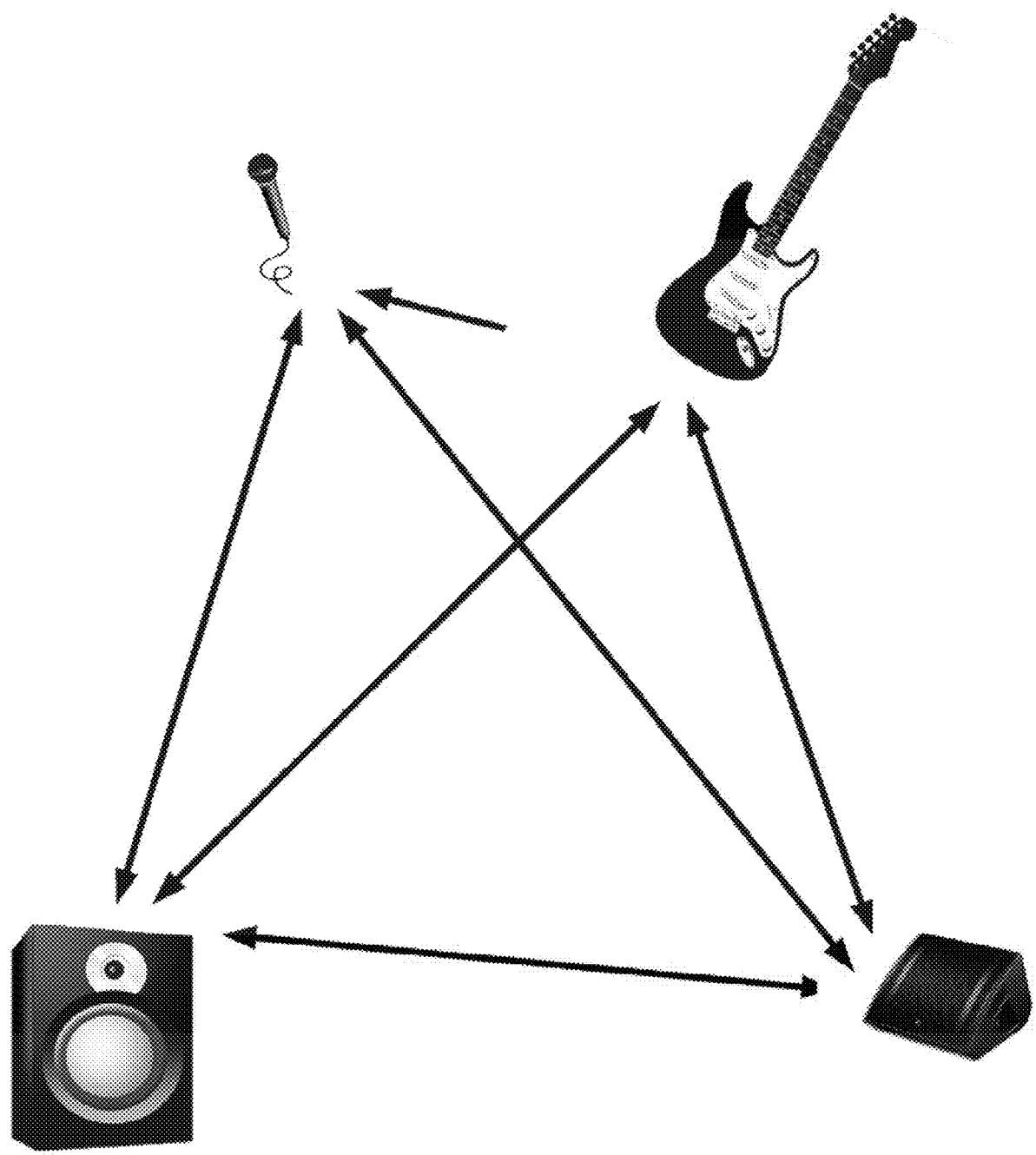
FIG. 3 illustrates a set of smart devices in a peer to peer network configuration.

Referring to FIG. 3, it is desirable to make each endpoint device of a media system smart by directly incorporating media processing capabilities appropriate to the endpoint type (input or output) and connecting each smart endpoint device via a packet-switched digital network communication system. A system control protocol may be implemented in a distributed fashion across all of the smart endpoint devices. Collectively, the smart endpoint devices implement all of the required functionality while also enabling additional functionality. In general, each of the smart devices include a processor and memory, together with input and/or output to the network, and input and/or output to an audio source (as an example) and/or a speaker source (as an example).

The intelligence and functionality that used to be instantiated within a sophisticated central device is thus moved out, at least in part, to the smart endpoint devices which operate in a peer-to-peer fashion among other smart endpoint devices. This peer to peer approach eliminates the need for a sophisticated central device and the attending limitations imposed by such devices.

Figure 4:
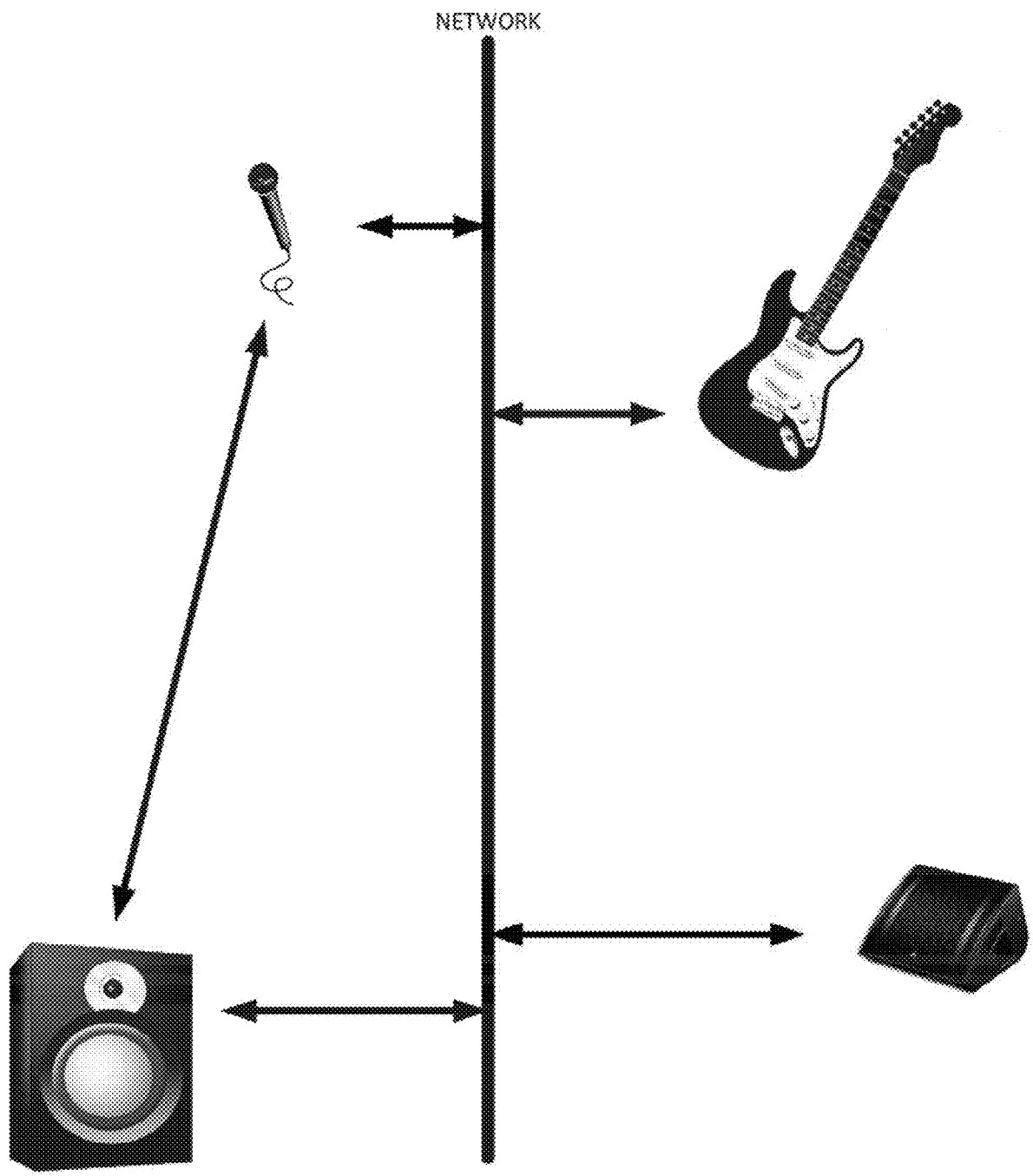
FIG. 4 illustrates a set of smart devices in a peer to peer configuration together with a network.

Referring to FIG. 4, the digital network enables each smart endpoint device to directly communicate with every other device using both point-to-point and point-to-multipoint transmission methods. The connection topology is peer-to-peer. The network simultaneously carries multiple synchronized media streams, metadata associated with media streams, and the messages needed for the endpoint devices to collectively implement the system control protocol.

The system control protocol allows endpoint devices to be dynamically inserted or removed from the media system, using any available network port, with plug and play simplicity. Adding an endpoint device to the system may be as simple as connecting a USB mouse to a personal computer. Upon adding an endpoint device to the network, it just shows up and is ready to be used. Thus no central panel needs to be configured to incorporate a new endpoint device.

Figure 5:
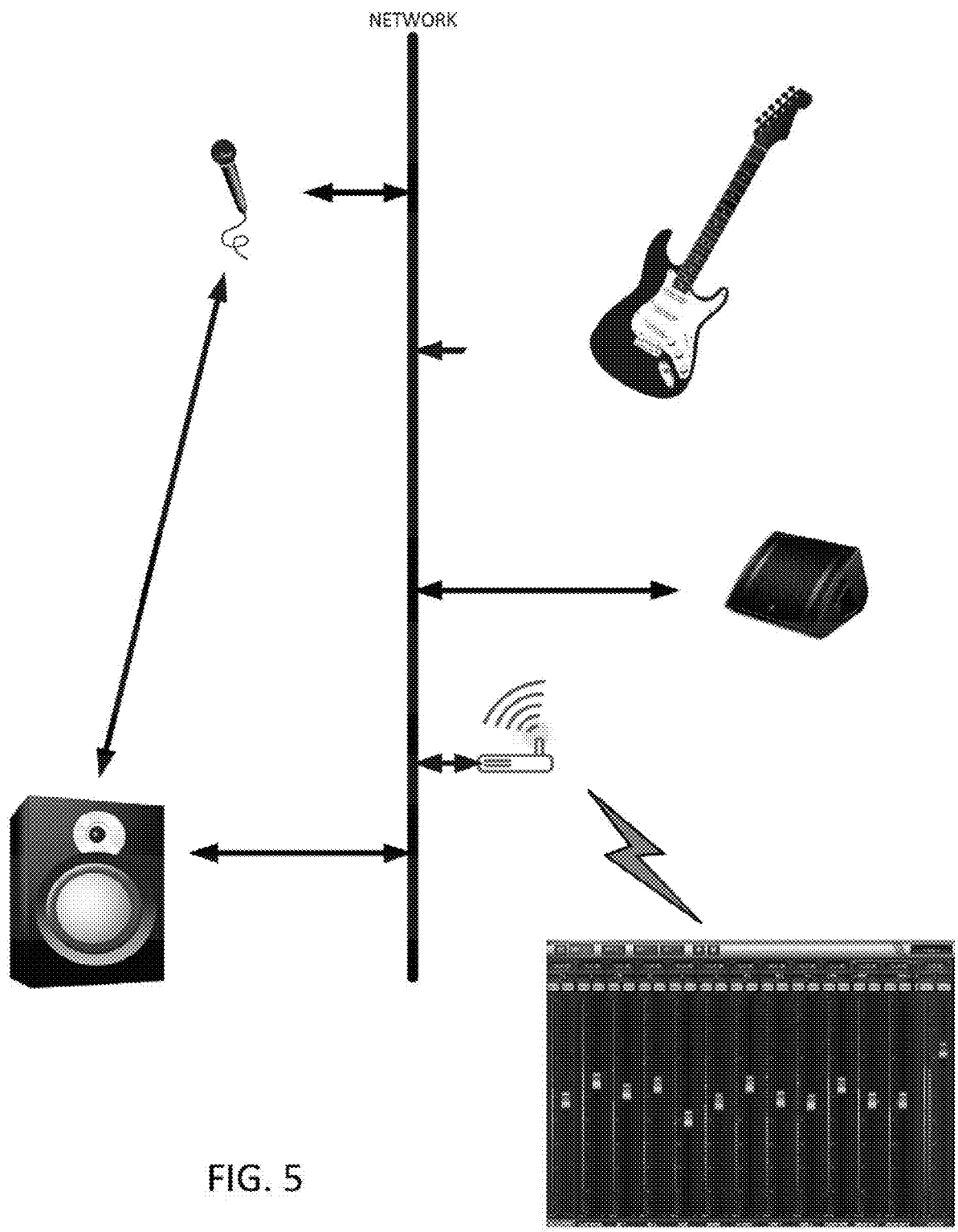
FIG. 5 illustrates a set of smart devices in a peer to peer configuration together with a network and a control panel.

The system control protocol also ensures that all media streams are properly synchronized and automatically routed from input devices to output devices with no operator intervention required and with very low latency. It maintains overall system state in a cohesive and robust manner. It also provides all of the information needed for a user employing a control application, typically (though not necessarily) running on a mobile device, to see all of the connected components and easily operate the system as desired, as illustrated in FIG. 5.

While the media system is operating, each smart input device multicasts its media streams on the network to all smart output devices, preferably including itself. System control messages also broadcast on the network instructing each smart output device as to how it should combine and enhance the received audio streams or select from amongst (and then possibly also enhance) the various video streams in order to render the specific output (sound or video image) that is needed from it.

Figure 6:
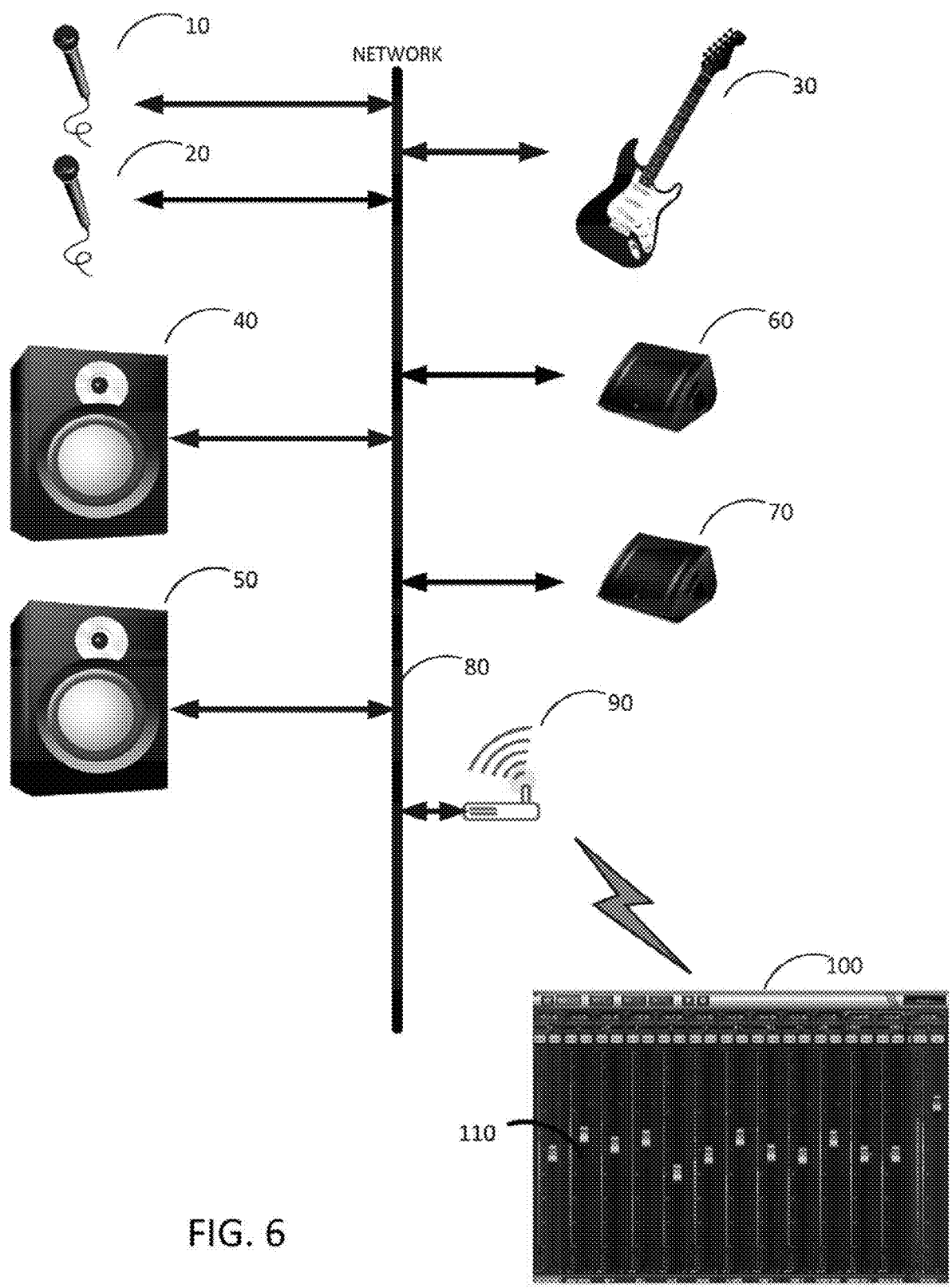
FIG. 6 illustrates another set of smart devices in a peer to peer configuration together with a network and a control panel.

Referring to FIG. 6, a sound reinforcement system is illustrated. Each of the various components are connected to the digital network 80 using any convenient port. Since this system preferably utilizes Ethernet for the digital network, devices would be connected to ports on one or more Ethernet switches. Unlike conventional sound reinforcement systems, it does not matter which port each component is plugged into.

For example, the sound to be reinforced may originate with two smart vocal microphones 10 and 20 and a smart electric guitar 30. Each of these input devices multicast their corresponding input audio stream to each of the smart output devices. The sound heard by the audience is as a stereo sound image produced by the combination of smart speakers 40 and 50. The performers use smart stage monitors 60 and 70, each of which produces a separate mono sound image, to help them hear better and thus perform better.

A WiFi adaptor 90 is also connected to the digital network 80, to allow a wifi enabled tablet device 100, running a system control application 110, to act as the system control device. The various media streams preferably do not flow over the WiFi link in order to avoid a significant increase in end-to-end system latency, and to avoid overwhelming the WiFi link with high traffic levels.

As it may be observed, no central mixing console or mixing engine is needed since all of the media processing may happen directly in the various endpoint devices. End-to-end system latency remains at a low value (approximately 2 ms) because each media stream is transmitted through the network exactly once.

Furthermore, because the system is controlled via a system control protocol, multiple instances of the control application can be run simultaneously on separate mobile devices. Performers could use their personal smart phones to control their own monitor mixes, while a sound engineer uses a tablet device to control the sound the audience hears. If desired, a hardware audio control surface with multiple faders, knobs, and switches could also be used to control the system. In this case software running on the control surface would translate between hardware control settings and system control protocol messages.

There is functionality that is preferably common to all smart audio endpoints. In the description provided herein, "endpoints" and "devices" are used interchangeably to describe devices that are used for input and/or output. One of the characteristics of all devices described herein is that each device provides either audio input and/or audio output, though preferably in most cases not both (although in limited cases, such as an intercom headset, both input and output may exist in the same enclosure, though they remain functionally independent. Input devices and output devices may be combined into a single package, but each side acts as an input or output device separately. There is preferably no "short-cut" connection between input and output of a particular device. In this manner the output is provided to the network from a device and the input is received from the network for the same device. As described the input devices and output devices—which primarily convert audio between the analog and digital domains—network connectivity, audio sample rate coordination, and implementation of the system control protocol are consistent for all devices.

With respect to network connectivity, all devices have a connection to a digital (normally packet-switched) network such as an Ethernet network. This Ethernet connection is based on industry standards, and may use both layer 2 (Data Link) and layer 3 (IP Network) protocols for various purposes. Data rates are preferably at least 100 Mbs, but can be gigabit or faster. Because the network connections use industry standards, virtually all commercially available network equipment (such as network switches) may also be used. Power for endpoints can (optionally) be provided by using Power Over Ethernet (POE). POE may be required for devices that do not have another power source. Physical Ethernet connections may be based on industry-standard RJ-45 connections, but may also be made using more robust Ethercon™ connectors, which are also fully compatible with RJ-45 connectors.

With respect to system wide clocking, all system devices are preferably synchronized to a common digital clock. This may be done through an implementation of the industry standard IEEE1588-2008 protocol, often referred to as Precision Timing Protocol (PTP). PTP requires one device to act as the clock master, while all other devices follow. As an industry standard, the IEEE1588-2008 specification provides information on how the best master clock is selected among available devices. Such a master-clock mechanism is used in a peer-to-peer environment, where devices may join or leave the network at any point in time. When a device that is acting as master clock is removed from the network, another device then provides the master clock service. IEEE 1588-2008 also allows for others clocks, such as clocks that are highly precise (GPS-based, for example) to provide master clock services.

With respect to audio sample rate coordination, every device on the network using network timing provided by PTP, the sample rate used to convert analog signals to digital, or to convert from digital signals to analog—a capability used by all smart audio devices, may be tightly coordinated. In fact, the sample rates on all smart devices on the network are preferably aligned with one another. Accordingly, the sampling rate should be the same for all the smart devices, and if a particular device has more than one potential sampling rate it should select a sampling rate that is common to all the other devices on the network. Even minor changes in audio sample rates may result in undesirable audible effects including pops, clicks, and jitter. All smart devices may use an aligned audio sampling rate to maintain synchronization of audio sampling across all devices on the network. Each device may be periodically checking sample rates and, as needed, making relatively minor adjustments in its sampling rate to maintain precision. This audio timing mechanism may use the capabilities of a system control protocol to maintain precision and minimize jitter.

With respect to the system control layer, distributed implementation of the system control protocol across all of the smart input and output devices provides added functionality. The distributed nature of the functionality permits independent and disparate media devices to act cohesively and collectively as one system, even as any device may be dynamically removed from or inserted into the system. To accomplish this, the system control protocol uses characteristics of digital networks including both point-to-point and multipoint transmission modes, and the ability to simultaneously carry multiple high bit rate, uncompressed media streams, as well as metadata, control commands, and status information. The system control protocol may be a coordinated set of instructions designed to make each device respond and act in the manner desired. The control protocol may have two layers—the hardware control layer and the application control layer.

With respect to the hardware control layer of the system control protocol, it is used to keep all devices and endpoints coordinated. Hardware control instructions are transmitted and received by endpoint devices only. No centralized processor is used for the hardware control layer. In that sense, the system is a true peer-to-peer system.

To make this system operate more efficiently, each device may be a master of itself only. This may be referred to as a single mater rule. Each input device maintains the settings for itself as an input, and each output device maintains the settings for itself as an output. If another device needs to know something about one of the other devices, it gets that information from the other device directly. The various devices preferably communicate their master information to many other devices frequently without necessarily receiving a request so that all devices can maintain updated information.

The hardware control layer provides low-level functionality by communicating settings to various devices on a need-to-know basis. For example, an audio input device may, as single master, maintain settings for volume. That information, however, is utilized on an audio output device. The input device, as single master, may communicate to the audio output device what that volume setting is, and update the output device whenever it changes. Because of the single master rule, many output devices are able to track the volume for each individual audio input device, and maintain control synchronization. The hardware control layer is normally implemented at the data link layer of the packet-switched network. Other data may be provided by the input device that is then used by the output device or other input devices.

The application control layer provides a mechanism for applications external to the device to control the parameters of the various devices. The application control layer is normally implemented on the network layer of the packet-switched network using standard Internet protocols such as UDP and TCP/IP. Using the application control layer, applications can query current settings and command new settings on the various endpoint devices. For example, if an application desires to change the volume for a specific device, the application control layer is used to make the request of the device (which is the single master) for the new value. The requested device responds when the change has been successful.

With respect to a capability discovery mechanism, the application control layer is dependent upon a description of the capabilities, present (and potentially unique) in each device. This description is referred to as a "schema". Each device has a schema that describes the functions, settings, attributes, and capabilities of that device. Each device can have a different schema. While many schema entries are common between devices (such as volume), some devices have schema entries for functions or capabilities that are unique to that device. For example, a speaker might have the capability of changing the crossover frequency. Control applications utilize schema information to know how to properly present the control capabilities of each device.

With respect to discovery and admission control, as smart endpoints are connected to the digital network they implement a discovery protocol to detect already connected system components and determine which component is currently acting as the master with respect to admission control. Devices then report in with the master and seek admission to the system. At this point, without any operator intervention, devices just appear on the control application.

Based on operator preferences, the master appropriately facilitates several admittance scenarios. One admittance scenario may be clean start—a device with all default settings is connected to the network and seeking to be admitted. Another admittance scenario may be transfer in—a device that still contains settings and metadata from its use in a previous performance seeks to be admitted. A further admittance scenario may be re-admittance—a device that had been operating in this system but went offline, due, say, to a brief power failure, is seeking to be readmitted.

Admission policies makes it possible for devices being re-admitted to quickly reappear on the operator's display without intervention, while also allowing the operator to decide whether other devices will be automatically admitted or admitted only after being re-initialized and only when the operator is ready. If at any time the device that is currently acting as master for admission control goes off line, the remaining devices will readily select a successor. In this eventuality no loss of state occurs, because the master device keeps other devices constantly updated and ready to step in if needed.

With respect to routing and disseminating input media streams to all output devices, as part of the admission process, input devices may be provided with network addresses to be used to multicast their input streams and corresponding mix-specific metadata. Once admission has taken place, input streams for unmuted devices are sent continuously to the designated network addresses. This mechanism eliminates the need for an operator to be involved in configuring and mapping signal paths. The input streams from all input devices are simultaneously available for consumption by all output devices. It also ensures a very low and constant end-to-end latency, since audio streams are sent across the network exactly one time.

With respect to grouping, another capability of the system is the ability of each device to be "grouped" with other devices. For example, a group of microphones that are used for backup vocalists, can be grouped together with a common volume or mute control. Grouping may be based upon tight coordination between devices at the hardware control layer, as well as at the application control layer. Groups create new virtual objects, which act like a device, but are not actually a physical implementation of such. Information about the virtual object resides in all group members, however to maintain the single master rule, only one device acts as the group master. Groups may be added or removed. Grouping may also be hierarchical, meaning a group can be a member of another group. Grouping is useful in reducing the complexity presented to a system operator. Instead of seeing faders for all 8 mics used on a drum kit, for example, the operator can see just one for the entire group.

With respect to robustly maintaining system state, the device acting as admission control master may also have the job of maintaining overall system state. This consists of a number of settings, policies, and assigned values that all components, including system control applications, may need to access. When a change in system state is made by, say, an operator using a system control application, the new value is sent to the master device which in turn makes it available to all other devices. Redundant copies of system state information is maintained in other devices so that "instant" failover can occur should the master device go offline.

With respect to persistent storage, all devices may include non-volatile memory for remembering hardware control settings, application control settings, and group membership information even when powered off. This allows devices to be removed from the network, then come up again as they were previously. Maintaining non-volatile memory across a distributed peer-to-peer system is facilitated as a result of the single master rule and coordination at the hardware control layer.

As illustrated in FIG. 6, devices 10, 20 and 30 are considered smart input devices. Examples of smart input devices include microphones, musical instruments, and audio playback devices. By way of example, the term "smart" may reference, that at a minimum each devices includes one or more of the following. The device may communicate via a digital network 80, which may be for example, an Ethernet connection. The device may synchronize itself to a system-wide clocking signal transmitted via the network. The device may utilize the system-wide clock to synchronously convert audio signals from the analog to the digital domain. The device may use multicasting of one or more digital audio streams to smart output devices. The device may make real-time input level metering data available to all instances of system controllers. The device may send device status information and receive commands to set device modes and parameters. The device may retain operating parameters and metadata in non-volatile storage. The device may implement system control protocols. The device may include a firmware update mechanism, error logging, and direct device interrogation via network protocols.

In addition, each smart input device may also keep track of a comprehensive set of parameters that instruct smart output devices regarding how the input device's media stream is to be processed when creating the various output mixes. This includes input fader level, multiband equalization settings and/or effect send levels to adjust the amounts of effects such as reverb or echo to be applied. These mix-specific parameters are transmitted throughout the system as metadata that is associated with the device's media stream.

Implementing the smart input device functionality directly within the device itself enables delivery of all the features in an error-free basis, together with true plug and play simplicity for both system setup and subsequent operation.

Figure 7:
FIG. 7 illustrates an audio input converter.

Referring to FIG. 7, to accommodate legacy microphones, instruments, and other sound sources that do not incorporate the requisite intelligence, a sound reinforcement system may also employ one or more audio input converters that allow such devices to supply an analog audio signal to the system via a legacy analog cable. Preferably, the audio input converter includes 2 or more connectors: a combo connector that accepts either a standard XLR audio cable(s) or a ¼" audio cable(s) (such as would typically be used for an electric guitar), and an Ethernet connector. The audio input converter implements the smart functionality enumerated above for smart input devices, while also receiving the legacy audio input. Other versions of audio input converters can also be constructed that accommodate other types of audio connectors and signals including, for example, a converter that accepts line level stereo signals such as would come from a personal media player.

Because control settings and metadata are stored within the converter on behalf of the associated legacy audio source, it is preferable to preserve a one-to-one relationship between each legacy audio source and its corresponding audio input converter.

In an alternative instantiation, one may gang together multiple audio converters into a single physical device with multiple analog input connectors and a single, shared, network connector. In order to avoid the configuration errors that could otherwise easily occur with such an instantiation (for example, mistakenly plugging a guitar into an input port where a drum was expected) it is preferable that a means be provided for the system to automatically determine which analog source device is connected to each input port.

This can be accomplished by embedding a tiny digital integrated circuit chip inside the analog source device (for example a microphone or guitar) when it is manufactured or, in the case of an existing device, within the device's existing analog connector. This integrated circuit chip receives power through and communicates digitally over the existing analog cabling. The presence of this chip does not in any way alter or degrade the functionality of the analog endpoint device. Further, circuitry within the audio input converter interacts, via the analog cabling, with the digital chip added to the analog source device, and thereby retrieves from it a unique digital identifier. This unique identifier is then used to access the set of operating parameters and metadata that is to be associated with the connected analog endpoint device.

As previously described, increasingly, digital technology is being used within media systems to transport media signals to and from the various endpoints (including microphones, speakers, cameras and displays) as well as to and from any central controller that may exist. It is also common for the functions of processing, mixing and switching of media signals to be done with digital technology. However, with most media systems, it is still necessary to connect numerous analog endpoints, such as microphones and speakers, to system media ports that convert between the analog and digital domains. These connections are made using analog cables and connectors which currently provide no means for a digital media system to unambiguously determine which specific analog endpoint device is being connected to a given input or output port. Typically a media system is configured by its operator to expect specific analog endpoint devices to be connected to specific ports, and the system will operate correctly only if the connections are made as expected. It is very common for errors to be made when setting up complex media systems, especially when it comes to connecting analog endpoint devices. Since the media system has no way of independently determining whether the analog devices were in fact connected as expected, if the system does not operate correctly it is incumbent upon human operators and technicians to perform complex and time consuming troubleshooting in order to find and fix the problems.

It is desirable in one embodiment to facilitate the digital media system to unambiguously determine which specific analog endpoint device is connected to each analog connection port, even while using existing analog cables and connectors, and without in any way interfering with the ability of such cabling and connectors to convey the analog signal. Further, it provides a way for a media system to persistently associate parameters and metadata with a specific analog endpoint device. In one embodiment, this is accomplished by embedding an integrated circuit chip inside the analog endpoint device when it is manufactured or, in the case of an existing device, within the endpoint's existing analog connector. This integrated circuit chip receives power through and communicates digitally over the existing analog cabling. The presence of this chip preferably does not in any way alter or degrade the functionality of the analog endpoint device. Further, circuitry may be added to the media system's analog connection port that can interact, via the analog cabling, with the digital chip added to the analog endpoint device, and retrieve from it a unique digital identifier. This unique identifier is then used to access a set of operating parameters and metadata that is associated with the connected analog endpoint device.

Figure 10:
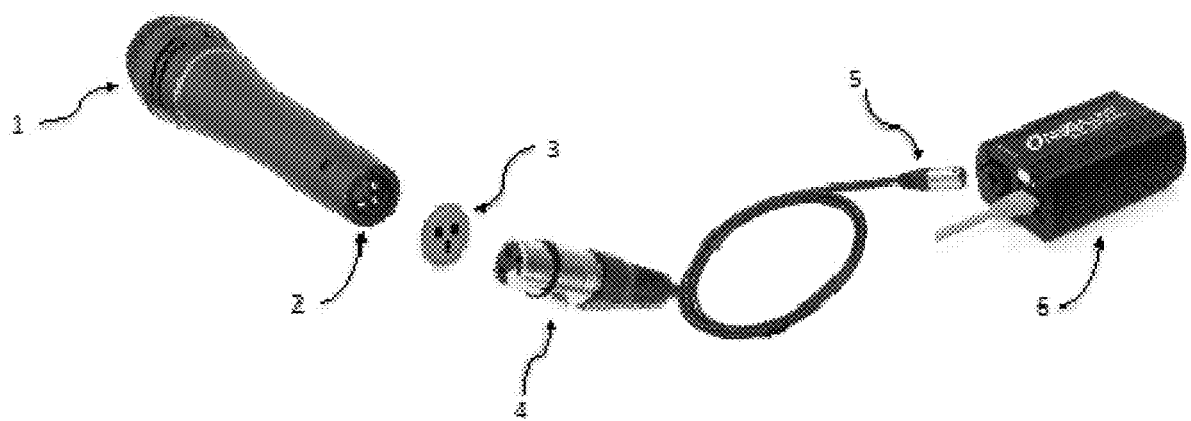
FIG. 10 illustrates another smart device.

Referring to FIG. 10, one embodiment includes a microphone (1) that has an integrated male XLR (or other) connector (2). A digital chip may be embedded in a thin disc (3) (or otherwise) that fits over the pins of the male XLR connector. A standard analog microphone cable with a female XLR (or other) connector (4) may connect to the microphone and mechanically mate properly. The other end of the microphone cable (5) connects to a media port (6) of a digital media system.

Figure 11:
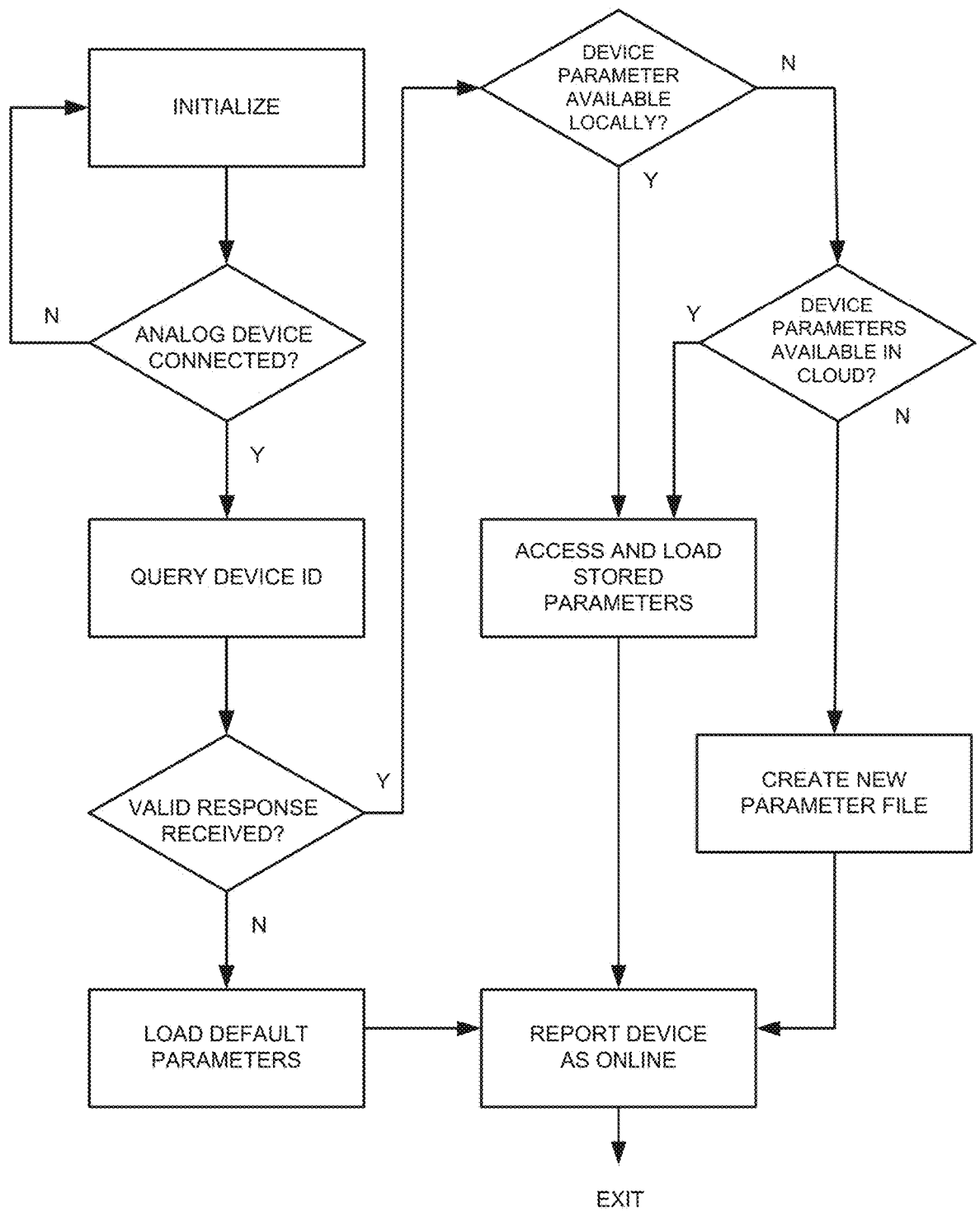
FIG. 11 illustrates a logic diagram for a system including the smart device.

Referring to FIG. 11, a logic flow that may be used within the media port is illustrated when an analog endpoint device, that includes the structure described with respect to FIG. 10, is connected to the media port. The flow includes initialize followed by whether an analog device is connected? If an analog device is connected it queries the Device ID. If no valid response is received, then it loads the default parameters and reports device as online. If a valid response is received, then it is determined whether the device parameters are available locally. If they are available locally, they are accessed and then load the stored parameters. Then the device is reported as being online. If the device parameters are not available locally, it is determined whether the device parameters are available in the cloud. If they are available in the cloud, they are accessed and then load the stored parameters. Then the device is reported as being online. If the device parameters are not available in the cloud, then a new parameter file is created, loaded, and the device is reported as online.

In the ideal case, a digital media system will have both operating parameters (such as gain and equalization) and metadata (such as device type and model, assigned device name and assigned function) associated with each endpoint device. This makes it possible for correct and consistent operating parameters to be assigned each time the device is connected to the media system, and provides a wealth of very useful information for the operator. This association of operating parameters and metadata with a specific endpoint is reasonably easy to do with digital endpoints, but up until now has not been feasible with analog endpoints. However, a media port, which transforms analog signals to or from the digital domain would be capable of associating such operating parameters and metadata with a specific analog endpoint device if there were a way to uniquely and unambiguously identify the particular device connected to it.

Digital integrated circuit (IC) technology may be used to assign a globally unique identifier to each analog endpoint device. It takes advantage of very tiny IC chips that come pre-programmed with a 64 bit or larger identifier, and can be powered and interrogated by unobtrusive means such as radio frequency waves or low voltage pulses on a signal line. Typical examples of this type of technology include radio frequency identification (RFID) tags and 1-Wire products from Maxim Integrated Inc.

Because the IC device is so small it can be easily integrated into an analog endpoint device at the time of its manufacturing. It can also be attached in a secure yet unobtrusive way to an existing (i.e. already manufactured) analog endpoint device, thus providing the analog device with a unique digital identifier. In one embodiment depicted in FIG. 10, a typical vocal microphone (1) is provided with a unique digital identifier as follows. A 1-Wire IC is embedded within a disc-shaped plastic substrate (3) with a thickness of less than 75 mm. This disc's diameter allows it to fit within the shell of the microphone's integrated XLR connector (2), and the disc has holes drilled that will fit over and make electrical contact with the 3 pins of the XLR connector. The 1-Wire IC is small enough to fit comfortably between the 3 XLR pins, and the plastic disc is thin enough that it does not prevent a female XLR connector (4) from mating and securely locking as it is designed to do. With proper design tolerances, the disc will not fall off the end of the microphone, even when no connector is attached, but, if necessary, can be removed. In a different embodiment of the invention, which is not illustrated, a RFID tag could be used in place of the 1-Wire IC.

Once an analog endpoint device has been appropriately fitted with an identifier IC, the circuitry within the media port (6) may interrogate the device and read its unique identifier. In the case of a 1-Wire IC, this is done by sending a series of low voltage pulses over one of the XLR signal lines. These pulses provide the power needed to operate the 1-Wire IC and instruct it to provide it's own pulses onto the signal line that correspond to the device's unique identifier.

In the case of an RFID tag, the media port would impose a low power RF signal onto the XLR wires which would be received by the RFID tag, cause it to power up and to modulate the received RF signal with its assigned unique identifier. The media port detects and decodes the modulated RF signal to recover the transmitted identifier.

While low voltage pulses or RF signals do not harm the microphone (1) in any way, it is recommended that this interrogation happen during the few milliseconds after the analog endpoint device is first connected and before its analog signals are converted to or from the digital domain. There are several well-known techniques for the media port to use in order to determine whether or not an analog endpoint device is currently connected. These include monitoring changes to input impedance or detecting analog signal activity above an established threshold.

As illustrated in the logic diagram of FIG. 11, there are 3 possible outcomes of the analog endpoint interrogation process. If the interrogation process was not successful in receiving a unique identifier, the media port does not know anything about the particular analog endpoint device connected to it, and must assume a default set of parameters and metadata that are used for all unidentified devices. If the interrogation yields a unique identifier then the media port must determine whether it has already seen this device before and has the appropriate parameters and metadata stored locally. If the media port has not seen this device before (or perhaps, not recently enough), and if Internet connectivity is available, it can query a cloud-based database, using the device's identifier as an index, to retrieve the needed operating parameters and metadata. If operating parameters and metadata are not available either locally or from the cloud, the media port will create a new data set using default values that are designated for use with identified but heretofore unfamiliar devices. As the media system is operated, updates will occur to the operating parameters, and may occur in the associated metadata as well. The media port will retain these changes in its local store, and, if configured to do so, may also update the cloud-based data store as well.

Once an analog endpoint device has been assigned a unique identifier and connected to the media system via one media port, it can be disconnected from that media port and re-connected on any other media port and its operating parameters and metadata will follow it. Thus imagine a stage box consisting of dozens of XLR connectors, each associated with a media port. The technician setting up a media system no longer needs to worry about which XLR connector each analog endpoint is connected to. It no longer matters. The media system will discover and correctly configure the analog endpoint regardless of which physical XLR connector is used.

If a cloud-based data store is utilized, a microphone can be moved from one venue to another venue and it's operating parameters and metadata will still follow it. Thus for example, a vocalist may own a personal microphone which has been configured to sound just the way they like it, and which includes metadata identifying it as their personal microphone. Whenever they plug their personal microphone into a digital media system equipped with this invention, no matter what venue they are at and no matter what port they plug it into, the microphone will be identified as their personal microphone and have their preferred operating parameters established.

In general, another embodiment enables a technique to associate a globally unique digital identifier with analog endpoint devices used in conjunction with digital media systems including professional and consumer audio-video entertainment systems for live performance, streaming media, or recorded media.

In general, another embodiment enables a technique to associate a globally unique digital identifier with an existing (i.e. already manufactured) analog endpoint device in such a manner that its operation is not in any way impacted or adversely affected.

In general, another embodiment enables a technique to interrogate an analog endpoint device's associated digital identifier over existing analog cabling and analog connectors.

In general, another embodiment enables a technique for associating both operating parameters and metadata with individual analog endpoint devices that have been assigned a digital identifier.

In general, another embodiment enables a technique to store operating parameters and metadata associated with a particular analog endpoint device local to a media system so that the analog endpoint device can be connected to any available media port.

In general, another embodiment enables a technique to store operating parameters and metadata associated with a particular analog endpoint device in the cloud so that the analog endpoint device can be connected to any available media port on any properly equipped media system anywhere in the world and have the proper operating parameters and metadata follow the analog endpoint device.

The smart audio output devices 40, 50, 60, and 70 will most often be instantiated as a powered speaker, an audio amplifier that drives a passive speaker, a network-connected pair of headphones, and/or an audio recording device. Smart output devices are preferably capable of one or more of the following. One capability of the smart output device is communicating via a digital network 80. Another capability of the smart output device is synchronizing to a system-wide clocking signal transmitted via the network. A further capability of the smart output device is receiving one or more multicast digital audio streams along with mix-specific metadata from other system components. Yet another capability of the smart output device is implementing mix-specific instructions associated with each incoming media stream to combine and enhance the received audio streams, producing a digital "mix" that is specific to this particular output device. Another capability of the smart output device is providing real-time output level metering data to all instances of system controllers. Another capability of the smart output device is utilizing the system-wide clock to synchronously convert the digital mix signal into sound emanating from the associated speaker. Another capability of the smart output device is sending device status information and receiving commands to set device modes and parameters. Another capability of the smart output device is retaining operating parameters and metadata in non-volatile storage. Another capability of the smart output device is implementing speaker management functions. Another capability of the smart output device is implementing the system control protocols. Another capability of the smart output device is providing firmware update mechanisms, error logging, and direct device interrogation via standard Internet and worldwide web protocols.

As a convenience to system designers and installers, smart speakers may also include speaker management functionality. Since many of these speaker management parameters are set according to a speaker's installed location within a venue and the speaker's physical characteristics, provision is included to lock these settings so that they are not changed inadvertently. Speaker management functionality may include one or more of the following: crossover settings, feedback suppression, delay, pink noise generation, tone generation, and/or level adjust.

As with smart input devices, the benefits are preferably implemented directly within each smart audio output device. Since speakers and amplifiers are usually physically larger and more expensive devices, embedding this functionality is usually quite feasible.

Figure 8:
FIG. 8 illustrates an audio output converter.

Referring to FIG. 8, where there is a need to use existing, non-smart sound output devices, such as speakers that are already installed within a venue, it may be desirable to utilize one or more smart output converters. This smart output converter may provide 3 connection points: a short audio cable with a male XLR audio connector, an Ethernet connector, and a female XLR connector. The male XLR cable provides a line level audio output that can be plugged directly into either a conventional powered speaker or into an audio amplifier. The inclusion of a female XLR connector, which accepts a line level analog input signal, allows the converter to be inserted in parallel with an existing legacy sound reinforcement system.

Figure 9:
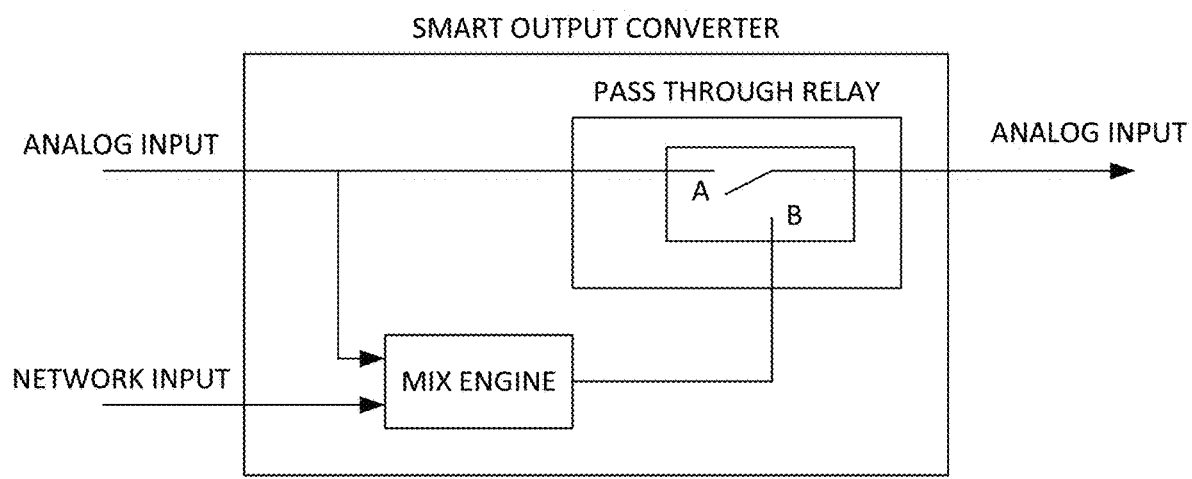
FIG. 9 illustrates a smart output converter.

Referring to FIG. 9, an exemplary operation of the smart output converter is illustrated. When the smart output converter is not powered, the pass through relay is latched in the A position, so the legacy analog signal passes straight through. When powered up the relay switches to the B position, and the mix engine combines both network input and the analog input, with a unity gain for the analog input.

The smart output converter of FIG. 9 implements all of the smart functionality previously enumerated for smart output devices in general, and smart speakers in particular. Other instantiations of audio output converters can also be constructed that accommodate other types of audio connectors and audio signals including, for example, a converter that delivers audio intended for headphone monitoring through a standard headphone jack. It is desirable to maintain a one-to-one relationship between a sound reproduction device (or recording device) and its associated converter. Doing so minimizes the potential to introduce configuration errors into the sound reinforcement system.

With respect to a system control software development kit, as previously noted, the system control protocol facilitates multiple instances of a control application to be used to operate the system. To make it easier to implement such control applications the system control software development kit (SDK) may also be used. The SDK encapsulates the protocol details and provides a programmatic interface for control applications to use. The SDK is preferably implemented as a software module that executes on the same platform that the control application is implemented on.

The availability of the system control SDK simplifies the implementation of different versions of a system control application. For example, a control application to be used by performers in controlling their own monitor mix would not provide access to control other mixes, including the house mix. It could also be optimized for use on the smaller sized screen of a mobile phone. A different version of the control application could be made available for non-technical persons who are renting a venue to be able to easily adjust the house mix without allowing overall volume levels to be too high and without exposing all of the detailed control capabilities that a professional sound engineer might utilize.

The system control SDK can also operate in a device emulation mode so that a sound engineer can pre-configure a show without needing to be connected to any of the actual devices. Using this capability the engineer can instantiate all of the various endpoint devices that will be needed, name the devices, and establish a set of initial operating parameters. This information can then be saved to a file and recalled when the actual system is being configured at the venue.

Device emulation mode also provides a very convenient and safe way for new operators to become familiar with the various functions and capabilities of the sound system control application.

An exemplary type of system is a sound reinforcement system for live performance where audio streams from one or more sources (e.g. microphones, musical instruments and devices containing pre-recorded audio) are combined and aesthetically enhanced in various ways before being sent to one or more speakers, where the several speakers serve different needs, as well as to one or more recording devices. A paging system serving the needs of one or multiple buildings where audible messages from one or several sources must be able to be dynamically routed to specific areas of a building or a collection of buildings (a campus), or to every location within the building or campus. Such a system supports coordination of message delivery such that messages from the various sources do not collide with one another, and so that emergency and life-safety messages are always delivered regardless of what other messages are currently being distributed. A consumer entertainment system where several sources of video entertainment (e.g. cable TV channels, digital video recorder, Blu-ray disc, video programming streamed via the Internet) and several sources of audio entertainment (e.g. broadcast radio, audio CD, audio media files and audio programming received via the Internet or via a personal mobile device) are simultaneously available for consumption using one or more video displays and speaker systems which may be located in one or more rooms throughout the consumer's home. A broadcast production facility where sources of audio and video (e.g. microphones, cameras and media playback devices) must be routed to a variety of different media processing stations, and the resulting processed media then sent on to a variety of destinations including monitoring equipment, recording devices and transmission head ends.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. An audio processing device comprising:
   (a) said audio processing device includes a first analog cable connector that receives at least one analog audio source signal from an analog source;
   (b) said first analog cable connector suitable to detachably interconnect said audio processing device to an analog cable;
   (c) said audio processing device transmits said at least one analog audio source signal to said analog cable;
   (d) said audio processing device includes digital identification data stored therein that uniquely identifies said audio processing device, wherein said digital identification data is not received from a device external to said audio processing device;
   (e) said audio processing device transmits said digital identification data to said first analog cable connector suitable to be received by said analog cable in response to a query external to said audio processing device;
   (f) an enclosure that encloses said audio processing device.

2. The audio processing device of claim 1 wherein said digital identification data is associated with metadata associated with said audio processing device.

3. The audio processing device of claim 1 wherein said audio processing device is a 1 wire device.

4. The audio processing device of claim 1 wherein said identification data uniquely identifies said audio processing device among a plurality of such audio processing devices within an audio system.

5. The audio processing device of claim 1 wherein said audio processing device receives a communication signal from said first analog cable connector connected to said analog cable and in response thereto provides said digital identification data.

6. The audio processing device of claim 1 wherein said digital identification data is a unique digital identifier.

7. The audio processing device of claim 1 wherein said first analog cable connector is a XLR connector.

* * * * *

UNITED STATES PATENT AND TRADEMARK OFFICE
CERTIFICATE OF CORRECTION

PATENT NO. : 10,742,727 B2
APPLICATION NO. : 15/452701
DATED : August 11, 2020
INVENTOR(S) : Edward D. Arrington et al.

It is certified that error appears in the above-identified patent and that said Letters Patent is hereby corrected as shown below:

In the Specification

Column 2, Line 13: Replace "the AN" with --the A/V--.

Signed and Sealed this
Fifth Day of September, 2023

Katherine Kelly Vidal
*Director of the United States Patent and Trademark Office*